(12) United States Patent
Chatterjee et al.

(10) Patent No.: US 10,565,700 B2
(45) Date of Patent: Feb. 18, 2020

(54) DIGITAL COLOR ASSESSMENT

(71) Applicant: Graftek Imaging Inc., Austin, TX (US)

(72) Inventors: Romik Chatterjee, Austin, TX (US); Eric Heinen, Austin, TX (US); Robert Eastlund, Austin, TX (US)

(73) Assignee: Graftek Imaging Inc., Austin, TX (US)

( * ) Notice: Subject to any disclaimer, the term of this patent is extended or adjusted under 35 U.S.C. 154(b) by 0 days.

(21) Appl. No.: 16/172,815

(22) Filed: Oct. 28, 2018

(65) Prior Publication Data
US 2019/0073761 A1 Mar. 7, 2019

Related U.S. Application Data

(62) Division of application No. 15/339,662, filed on Oct. 31, 2016.

(51) Int. Cl.
| | | |
|---|---|---|
| *G06T 7/00* | (2017.01) | |
| *H04N 1/60* | (2006.01) | |
| *G06T 7/90* | (2017.01) | |
| *H05B 33/08* | (2006.01) | |

(52) U.S. Cl.
CPC ............ *G06T 7/0004* (2013.01); *G06T 7/90* (2017.01); *H04N 1/6033* (2013.01); *H04N 1/6086* (2013.01); *G06T 2207/10024* (2013.01); *G06T 2207/30164* (2013.01); *H05B 33/0872* (2013.01)

(58) Field of Classification Search
CPC . G06T 2207/10024; G06T 2207/30164; G06T 7/0004; G06T 7/90; H04N 1/6033; H04N 1/6086; H05B 33/0872
See application file for complete search history.

(56) References Cited

U.S. PATENT DOCUMENTS

| | | | |
|---|---|---|---|
| 5,309,256 A | | 5/1994 | Takada et al. |
| 5,580,172 A | * | 12/1996 | Bhardwaj ............. G01K 11/12 374/137 |
| 5,714,734 A | | 2/1998 | Peterson et al. |

(Continued)

OTHER PUBLICATIONS

International Search Report from PCT/US17/59187 dated Mar. 7, 2018.

*Primary Examiner* — Kim Y Vu
*Assistant Examiner* — Michael J Vanchy, Jr.
(74) *Attorney, Agent, or Firm* — Schultz & Associates, P.C.

(57) ABSTRACT

A machine includes an enclosure having a double layer wall including an outer wall that provides mechanical protection and protection from dust, fluids and environmental factors and an inner wall having a gradient change in reflectance with height within the enclosure; a lens coupled to the enclosure, the lens defining an optic axis-within the enclosure parallel to the gradient change in reflectance with height; a camera coupled to the lens; an image processing circuit coupled to the camera; and a plurality of light sources coupled to the enclosure, the plurality of light sources defining a plurality of illuminant axes located substantially symmetrically around and parallel to the optic-axis. Each of the plurality of light sources includes a plurality of independently controllable segments located along the illuminant axes so an angle of illumination from the plurality of light sources to the optic axis can be controlled.

8 Claims, 10 Drawing Sheets

(56) References Cited

U.S. PATENT DOCUMENTS

| | | | |
|---|---|---|---|
| 6,441,923 | B1 | 8/2002 | Balasubramanian et al. |
| 7,230,707 | B2 | 6/2007 | Ingleson et al. |
| 8,040,560 | B2 | 10/2011 | Albat et al. |
| 8,064,057 | B2 | 11/2011 | Styles et al. |
| 2002/0097400 | A1 | 7/2002 | Jung et al. |
| 2003/0081214 | A1 | 5/2003 | Mestha et al. |
| 2004/0227948 | A1* | 11/2004 | Debevec ................ G01N 21/55 356/445 |
| 2006/0049782 | A1* | 3/2006 | Vornsand ........... H05B 33/0869 315/312 |
| 2010/0020106 | A1 | 1/2010 | Gil et al. |
| 2010/0079829 | A1 | 4/2010 | Edge |
| 2012/0076405 | A1 | 3/2012 | Brunner et al. |
| 2013/0050504 | A1 | 2/2013 | Safaee-Rad et al. |
| 2014/0022571 | A1 | 1/2014 | Ishizaki et al. |
| 2014/0211022 | A1 | 7/2014 | Koh et al. |
| 2015/0070510 | A1 | 3/2015 | Mui |
| 2015/0370146 | A1* | 12/2015 | Johnson ................ G03B 15/07 396/4 |
| 2016/0134784 | A1 | 5/2016 | Nishizawa |

* cited by examiner

Calibration and Measurement process flows

Application- inspection of diffuse flat workpiece

Application- inspection of shiny spherical workpiece

DIGITAL COLOR ASSESSMENT

CROSS-REFERENCE TO RELATED APPLICATION

Referring to the application data sheet filed herewith, this application is a divisional of, and claims a benefit of priority under 35 U.S.C. 120 from co-pending utility patent application U.S. Ser. No. 15/339,662, filed Oct. 31, 2016 the entire contents of which are hereby expressly incorporated herein by reference for all purposes.

BACKGROUND

Measurement of the radiometric spectral reflectance of one or more arbitrary areas on a sample can be used to characterize the physical properties of the sample. Such a spectrally resolved measurement is often reduced to a photometric color in a three dimensional (e.g. RGB, Lab, HSL, etc.) space which expresses the appearance to a human observer. Color is a human perception and affects economic value in many applications. For example, the color of meat and distribution of the marbling, the color of fruits and vegetables, the color of manufactured goods and processed foods, the colors of materials used in clothing, upholstery and other industrial processes. What is needed is a rapid, repeatable and accurate method of measuring colors, on multiple arbitrary areas on a product. This would be a critical tool to ensure the product's quality and, therefore, its economic value.

Among the many standards for measurement of color, the most widely accepted are the ones developed by the CIE (International Commission on Illumination); and these have been adopted in many industries. Measurement of color is most commonly achieved by using a contact spectrophotometer which uses an integrating sphere for accurate radiometric measurement of the spectral reflectance and its subsequent conversion to photometric units. Although accurate, the measurements are typically made over an area of only a few millimeters and do not have the spatial resolution needed to measure the color patterns on many natural and manufactured surfaces.

Absolute color measurements are typically computed and communicated using international standards such as CIE 1931 Lab space. This classic standard is described in "The C.I.E. colorimetric standards and their use" in Transactions of the Optical Society, 33(3):73 December 1930 by T Smith and J Guild.

One aspect of precision color measurement has been to characterize a sample using one or more standardized reference illuminants. For instance, U.S. Pat. No. 8,064,057 describes approximating multiple reference illuminants by using a basic lamp plus LEDs (light emitting diodes) in different combinations to compensate for the differences between the basic lamp and the reference illuminant(s).

Another aspect of accurate color measurement has been to characterize a sample using a combination of a spectrophotometer and a camera. For example, U.S. Pat. No. 7,230,707 describes color measuring using a spectrophotometer in combination with a camera.

SUMMARY

There is a need for the following embodiments of the present disclosure. Of course, the present disclosure is not limited to these embodiments.

According to an embodiment of the present disclosure, a process comprises: assessing color digitally including imaging digitally a custom color calibration chart under a set of lighting conditions; imaging digitally a workpiece under substantially identical lighting conditions; and comparing color measurement data from the custom color calibration chart to color measurement data from the workpiece to characterize the workpiece.

According to another embodiment of the present disclosure, a machine comprises: an enclosure defining a principle axis; a lens coupled to the enclosure, the lens defining an optic axis that substantially parallel to the principle axis of the enclosure; a camera coupled to the lens; an image processing circuit coupled to the camera; and a plurality of elongated light sources defining a plurality of illuminant axes located substantially symmetrically around the principle axis of the enclosure, wherein each of the plurality of elongated light sources includes a plurality of independently controllable segments.

According to another embodiment of the present disclosure, a process of making a wide gamut color chart comprises: providing a substrate; laying out a pattern for color patches on a surface of the substrate to define a total number of available color patches; allocating a first fraction of the total number of available color patches to a set of boundary colors; allocating a second fraction of the total number of available color patches to a set of interior colors; picking the set of boundary colors by substantially randomly sampling the set of boundary colors from an outer surface of a gamut of all colors that are producible with regard to a color production machine; writing the set of boundary colors to a digital file; dividing the gamut of all printable colors into a plurality of substantially equal sub-volumes corresponding to the second fraction of the total number of available color patches; picking the set of interior colors by sampling an interior color from an interior of each of the plurality of substantially equal sub-volumes; writing the set of interior colors to the digital file; converting the digital file to a native color space of the color production machine; producing a set of boundary color patches corresponding to the first fraction of the total number of available color patches on the surface of the substrate using the color production machine; and producing a set of interior color patches corresponding to the second fraction of the total number of available color patches on the surface of the substrate using the color production machine.

According to another embodiment of the present disclosure, a manufacture comprises: a wide gamut color chart including a substrate and a plurality of color patches coupled to the substrate, wherein a first fraction of the plurality of color patches are boundary colors selected from a boundary of a wide gamut and wherein a second fraction of the plurality of color patches are interior colors selected from each of a plurality of substantially equal sub-volumes defined within the wide gamut.

According to another embodiment of the present disclosure, a process of making a custom color calibration chart comprises: measuring spectroscopically a plurality of sample areas on a workpiece and a plurality of color patches on a wide gamut color chart under substantially identical lighting conditions; writing data representing the measured plurality of sample areas and the measured plurality of color patches to a digital file; computing L*a*b* values from the measured plurality of sample areas and the measured plurality of color patches; writing the computed L*a*b* values to the digital file; providing a substrate; laying out a pattern for color patches on a surface of the substrate to define a total number of available color patches; allocating a first fraction of the total number of available color patches to a set of boundary colors selected from boundary colors that are present on the wide gamut color chart; allocating a second fraction of the total number of available color patches to a set of sample gamut colors selected from interior colors that are present on the wide gamut color chart; picking the set of boundary colors from boundary colors that are present on the wide gamut color chart based at least some of the set of boundary colors being close to computed L*a*b* values from the measured plurality of sample areas; writing the set of boundary colors to a digital file; picking the set of sample gamut colors from interior colors that are present on the wide gamut color chart based on closest available to computed L*a*b* values from the measured plurality of sample areas; writing the set of sample gamut colors to the digital file; converting the digital file to a native color space of the color production machine; producing a set of boundary color patches corresponding to the first fraction of the total number of available color patches on the surface of the substrate using the color production machine; and producing a set of sample gamut color patches corresponding to the second fraction of the total number of available color patches on the surface of the substrate using the color production machine.

According to another embodiment of the present disclosure, a manufacture comprises: a custom color calibration chart including a substrate; and a plurality of color patches coupled to the substrate wherein a first fraction of the plurality of color patches are boundary colors selected from a boundary of a wide gamut and wherein a second fraction of the plurality of color patches are sample gamut colors selected from each of a plurality of substantially equal sub-volumes within a gamut of interest defined by a digitally imaged workpiece.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description presented herein. It should be noted that the features illustrated in the drawings are not necessarily drawn to scale.

DETAILED DESCRIPTION

Embodiments presented in the present disclosure and the various features and advantageous details thereof are explained more fully with reference to the nonlimiting embodiments that are illustrated in the accompanying drawings and detailed in the following description. Descriptions of well-known materials, techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

The below-referenced U.S. Patents disclose embodiments that are useful for the purposes for which they are intended. The entire contents of U.S. Pat. Nos. 8,064,057 and 7,230,707 are hereby expressly incorporated by reference herein for all purposes.

Embodiments of this disclosure are directed to digital color assessment apparatus, charts and methods. Embodiments can include an integrated computer. Embodiments can include one or more integrated camera(s) together with associated lens(es). Embodiments can include an enclosure that is an easy to manufacture rectangular shaped box. A sample or specimen to be characterized can be placed on a floor of the box. In a preferred embodiment, the enclosure can include multiple lights configured symmetrically around a vertical axis. In a preferred embodiment, all the multiple lights can be controlled independently. In a preferred embodiment, each light is segmented vertically so the angle of illumination from that light to the sample can be controlled.

Figure 1:
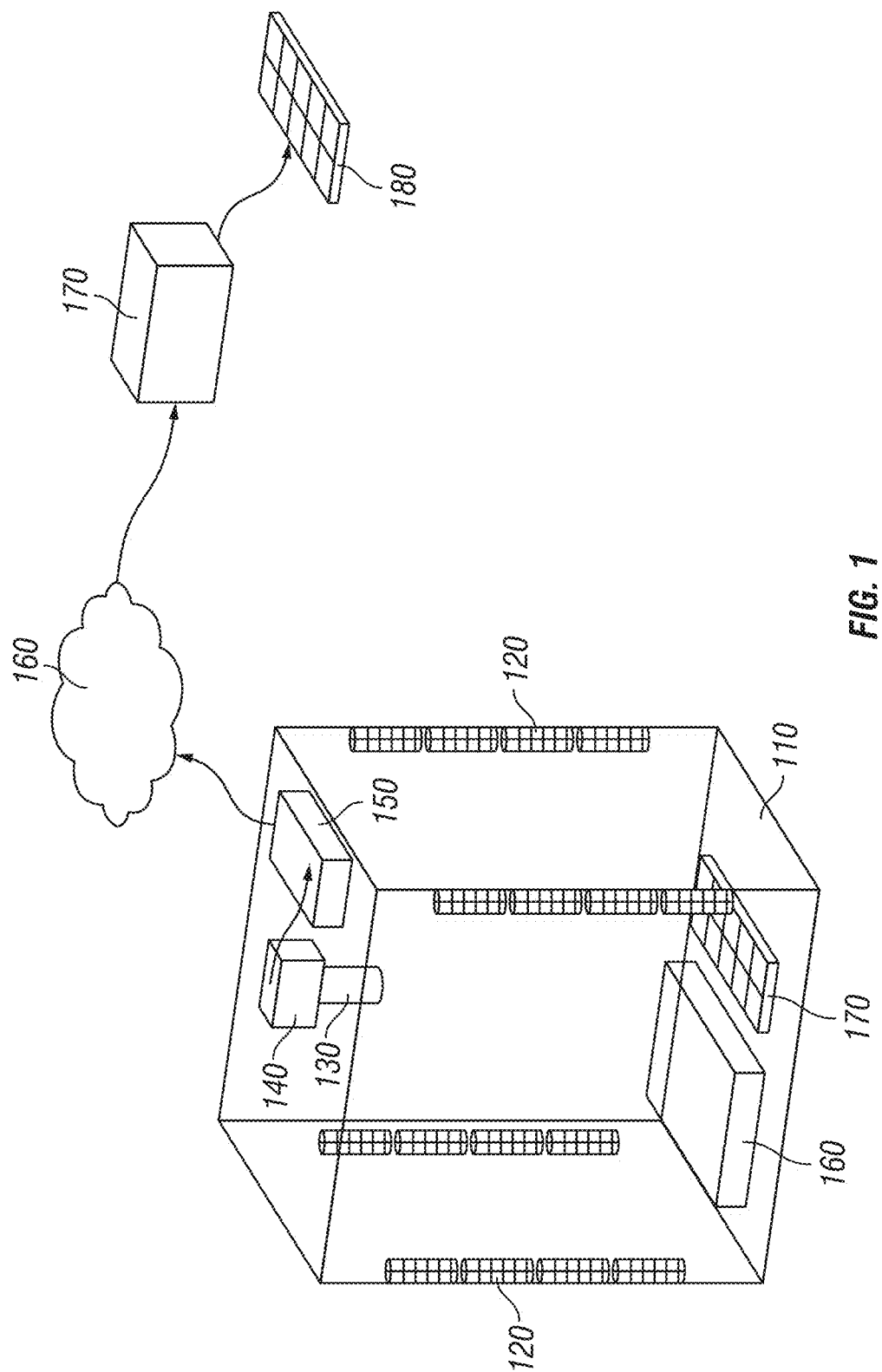
FIG. 1 is a stylized depiction of a process of making a custom color calibration chart (workpiece target) using a wide gamut color chart (reference target) and a specimen.

An important aspect of embodiments of this disclosure is that digital color assessment can include producing a custom color calibration chart having a gamut of interest using a model or gauge representing a product and a wide gamut color chart including a plurality of standardized color chips. Referring to FIG. 1, an enclosure 110 includes a plurality of light sources 120, a lens 130 a camera 140 and an image processing system 150. Located within the enclosure 110 are a gauge 160 and the wide gamut color chart 170. In this embodiment, the image processing system 150 is coupled to a data processing and printing system 170 via a network 160. The data processing and printing system produces a custom calibration chart 180.

Figure 2:
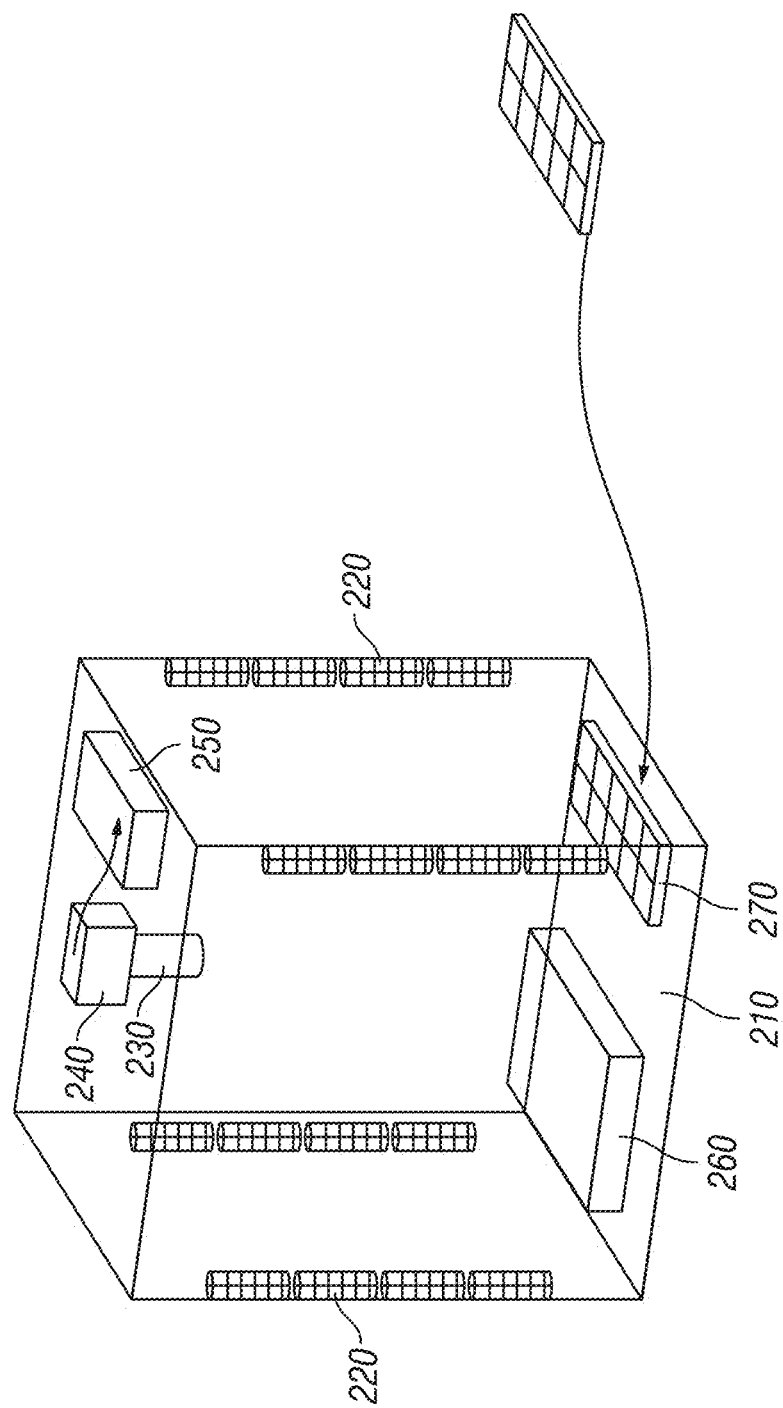
FIG. 2 is a stylized depiction of co-locating another custom color calibration chart with another specimen.

An important aspect of embodiments of this disclosure is that digital color assessment can include performing an image calibration (which can be termed an initialization) with the custom color calibration chart that includes the gamut of interest and a sample or specimen of the product. Referring to FIG. 2, an enclosure 210 includes a plurality of light sources 220, a lens 230, a camera 240 and an image processing system 250. Located within the enclosure 210 are a specimen 260 and a custom color calibration chart 270. In FIG. 2, the custom color calibration chart 270 is shown being placed within the enclosure 210.

Embodiments of this disclosure can use an Industrial camera (i.e. no on-board color correction) for raw R,G,B output. Embodiments of this disclosure can use white LEDs as actinic radiation sources. These can have a broadband emission that is not a perfect blackbody. It is an advantage of embodiments of this disclosure that a high color rendering index is not required. This is in contrast to assessment of colors with human vision where a high color rendering index is needed. Embodiment of this disclosure can use symmetric lighting around an axis defined by the camera, lens and/or sample or specimen. Embodiments of this disclosure can use polarized light sources. By using a polarizer on the camera, glare can be reduced or eliminated. Additionally, specular reflection can be measured by comparing data between a polarized light image and a non-polarized light image.

Embodiments of this disclosure can include a wide gamut calibration chart (reference target) designed to contain colors within all reproducible colors. The use of the wide gamut calibration chart can be serialized so each color patch is measured and software can read up a data file for the spectral values for each color patch. This means the spectral values of each patch can be saved to a computer file.

Figure 3:
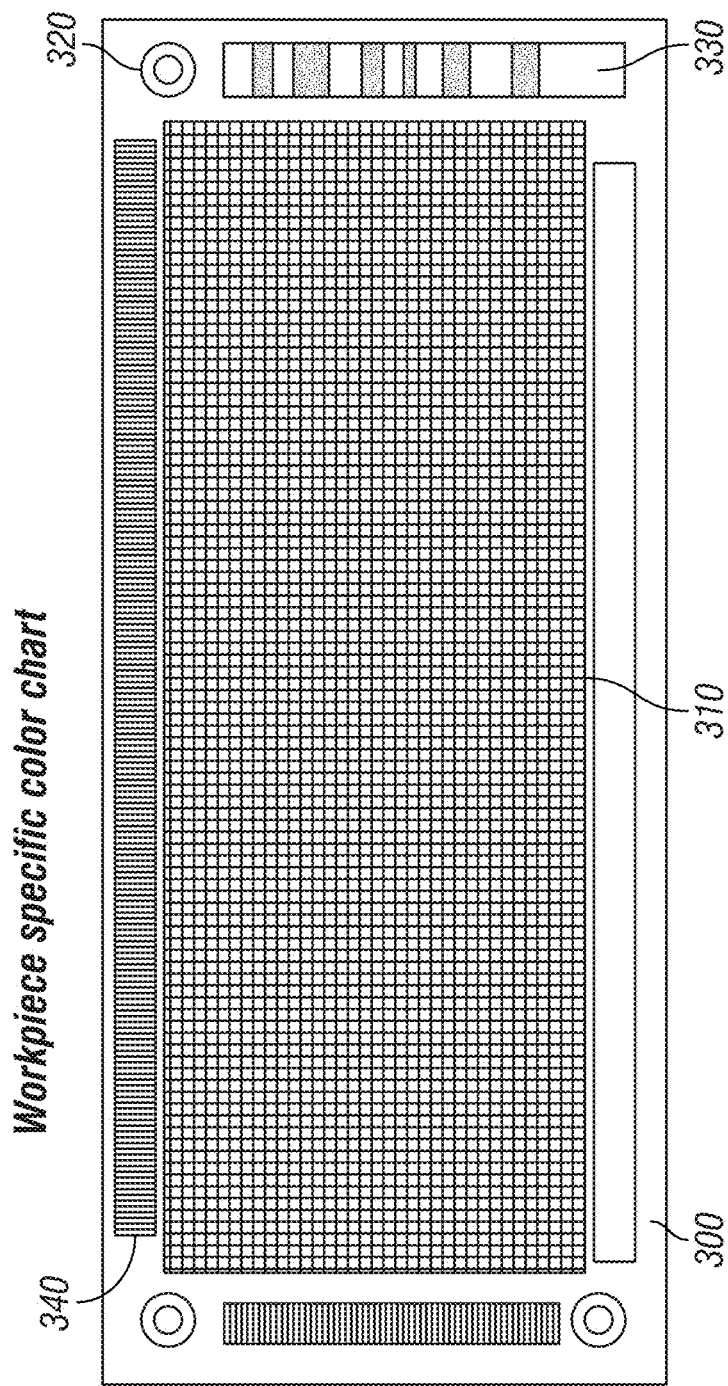
FIG. 3 is a view of an exemplary custom color calibration chart (workpiece target).

Embodiments of this disclosure can include a custom color calibration chart (calibration target) designed to contain colors within the gamut of interest. This can be termed to be a workpiece specific color chart. Referring to FIG. 3, a custom color calibration chart 300 can include a grid of color patches 310. Of course, the color patches can be spatially arranged in other ways such as radially or even three dimensionally. The custom color calibration chart can include fiducials 320 for orientation. The custom color calibration chart can include a bar code 330 for serialization. The custom color calibration chart can include one or more focusing bars 340. The use of the custom color calibration chart can be serialized and the imaging sequential so each color patch is measured and software can read up the spectral values for each color patch.

It can be appreciated that the particular calibration chart shown in FIG. 3 is just one particular embodiment. A custom color calibration chart can be embodied in other forms. For instance, a custom color calibration chart can be embodied in a photograph such as, for example, a pdf image or a jpeg image. Further, a custom color calibration chart can be embodied in a 3D facsimile of a workpiece.

Embodiments of this disclosure can include simultaneous spectroscopic digital imaging of both a workpiece and a custom color calibration chart that include a gamut of interest. However, the workpiece and custom calibration chart can be spectroscopic digital imaged separately as long as the characterization environment is substantially the same. For instance, the camera and lens should be substantially the same. The lighting should be substantially the same. Similarly, the enclosure should be substantially the same.

Spectral values allow computation for different illuminants. This allows the software to calibrate between known spectral reflectance values and Rgb for each patch and create a model with the multiple color patches. More patches can be used. More colors lead to more accuracy for a given size of the color gamut. As accurate as necessary for practical applications with a specified gamut range of color. Redundancy of colors and of layout can make the process of calibration robust. Can include a onetime calibration and an optional inline calibration with a (mock) workpiece. This allows computation of Color L, a, b values with any illuminant (D50, D65, etc.). Multiple systems can be calibrated with the same or substantially similar calibration chart to produce the same color outputs. The hardware does not have to be the same. Color charts can be manufactured with variations as long as multiple colors are used even if the colors vary slightly between production runs.

Hardware aspects of embodiments of this disclosure will now be described. An apparatus can include one or more cameras viewing the workpiece. The camera(s) can be placed with separation to allow stereo imaging. Cameras can be monochrome or color (RGB). The camera(s) can be multi-sensor (e.g. 3 ccd, RGB+Monochrome) or multi-spectral. The camera(s) can be typical 2d area cameras or linescan cameras with a one-dimensional array of pixels. It is advantageous for the camera(s) to be fitted with an appropriate lens using standard mounts (e.g. c-mount, f-mount, etc.) to view the workpiece with sufficient resolution. Using a selection available from the domain of commercially available standard machine vision cameras (e.g. Basler, AVT, etc.) sometimes allows for selection of camera suitable for a given application.

Sectioned LED lighting for illumination will now be described. Each sectioned LED can include white at suitable color temperatures, primary colors (RGB) or any combination of narrow spectrum LED's. Suitable color temperatures for white include all white LED's with broadband emission, irrespective of their color rendering index (this being useful only for human vision), with stable and sufficient output for the particular lens and camera used in the system. If the white LED's lack power in particular parts of the spectrum, they can be augmented with other LED's.

If the LED's output UV or other radiation can cause fluorescence of some or all of the workpiece, the reflectance of the workpiece can be measured in two parts as follows. First, the workpiece is illuminated with all wavelengths excluding the excitation wavelengths and the reflectance for all these non-fluorescence wavelengths is measured. Second, the workpiece is illuminated with each excitation wavelength and the reflectance is measured at that specific wavelength together the fluorescence. This data can then be combined, optionally with other images, to estimate the reflectance in the entire color space. This can be termed fluorescence segregation.

In general, lighting geometry should result in a diffuse reflection from the (matte) workpiece entering the lens of the camera. Specular reflection may be minimized by using a)

LED's at the appropriate angles to the normal of the workpiece, b) polarized light and a polarizer on the lens that is set to accept the cross-polarized reflection from the workpiece. This can be termed specular minimization.

Lighting non-uniformity can be corrected in software by recording calibration images with a known uniform target and computing the smooth function required to correct the observed non-uniformity. This can be termed smoothing non-uniformities. Optionally, embodiments can include illumination on the opposite side of the workpiece from the camera, to serve as a backlight for an image in which outlines of parts or openings within the workpiece(s) can be viewed distinctly. This can be termed backlighting.

A fixture for placing a workpiece can include guides for placement of the workpiece. Preferred embodiments provide repeatability of placement. Optionally, the fixture can include a custom color calibration target with multiple color patches and a barcode for identification of the custom color calibration target. Optionally, the fixture can include a weighing scale to characterize the mass of the workpiece and/or some other parts of the fixture. Optionally, the fixture can include a movement stage to translate or rotate the workpiece.

Multiple images of the workpiece may be acquired with overlapping (camera angle) regions that can then be used to compute shape measurement of the workpiece. The computed shape of the workpiece can be used to correct for perceived differences in color, shadows and specular reflection. Optionally, embodiments can include a robot to manipulate the workpiece.

Embodiments of this disclosure can include one or more computers. The computer(s) can be used for control of the camera. The computer(s) can be used for control of each LED section. The computer(s) can be used for control of a movement stage. The computer(s) can be used when acquiring one or more images from the camera. The computer(s) can be used when performing calibrations with suitable targets. The computer(s) can be used when applying calibrations and corrections to images of workpieces.

Embodiments of this disclosure can include one or more monitors. The monitor(s) can be for one or more users to interact with system computer. The monitor(s) can be for one or more users to initiate color measurements on a workpiece. The monitor(s) can be for one or more users to view color measurements on workpiece. The monitor(s) can be for one or more users to view the result of a color based inspection on the workpiece. The monitor(s) can be for one or more users to review statistical results of multiple workpieces that have been inspected. The monitor(s) can be for one or more users to perform calibration. The monitor(s) can be for one or more users to initiate other actions e.g. Save images, define new workpieces, etc.

Embodiments of this disclosure can include automation hardware that can include relays or other controllers that receive instructions from another automation controller to initiate placement of a workpiece, initiate an inspection and removal of the workpiece. The automation hardware can be used to control the lighting (e.g. switching, intensity, color, etc). The automation hardware can be used to initiate the focusing of the lens(es).

Figure 8:
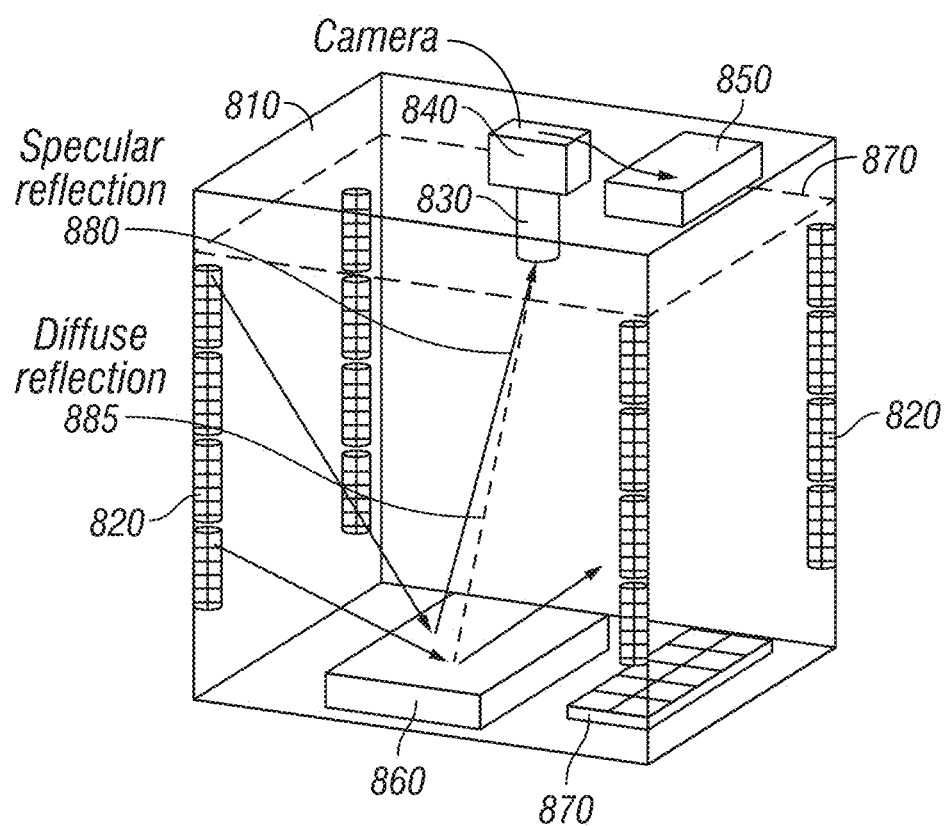
FIG. 8 is a schematic perspective view of a machine for digital color assessment including a plurality of symmetrically arranged segmented light sources.

Referring to FIG. 8, embodiments of this disclosure can include an enclosure 810. The enclosure can include a rectangular box with a double layer wall. The enclosure 810 includes a plurality of sectioned light emitting diode strips 820. The sections can advantageously be independently controllable. Coupled to the enclosure 810 are a lens 830, camera 840 and image processing circuit 850. Located within the enclosure 810 are a specimen 860 and a custom color calibration chart 870. Specular reflection 880 is represented by solid arrows from the specimen 860. Diffuse reflection 885 is represented by the dashed arrow from the specimen 860.

An inner wall material can advantageously have a spectrally uniform light reflectance. The inner wall material can advantageously have a matte texture to eliminate any specular reflection that causes hot spots on the workpiece (uneven illumination). The inner wall material can advantageously have a (gradient or step) change 870 in reflectance with height or angular location within the enclosure as shown in FIG. 8. The inner wall material can advantageously be optically opaque to eliminate any light from entering the enclosure. A preferred material for the inner wall material is plastic (for low cost) or ceramic for high temperature resistance.

An outer wall provides mechanical protection and protection from dust, fluids, and other environmental factors found in a laboratory or factory setting. A preferred material for the outer wall is metal such as stainless steel or anodized aluminum.

The enclosure can include one or more mounting devices for segmented LEDs. The enclosure can include one or more mounting devices for camera(s). The enclosure can include one or more access panels for loading and unloading the workpiece.

Embodiments of this disclosure can include a custom color calibration target. The custom color calibration target can be termed a workpiece specific calibration target. The custom color calibration target can include multiple patches of colors arranged in a pattern. The patches can be rectangular, sectors of a circle, triangular or other appropriate shape. Colors are picked to represent the colors found on the workpiece. The custom color calibration target can include a unique Bar code representing the production information of the target including the production date, the measurements of the colors of each patch and other information related to the layout of the chart. The custom color calibration target can be a shaped three dimensional color target such as a pyramid, a sphere, a pear-shaped object, etc.

The custom color calibration chart can include one or more layers. The custom color calibration chart can include a color layer. The color layer is a substrate that is compatible with inkjet or other direct-to-substrate printers, paper with special coatings, a material compatible with multicolor 3d printer technology, roll of vinyl or other material compatible with printers that can accept infeed of rolls, etc. An optional layer is a coating or lamination applied to the color substrate to protect it from environmental factors such as UV, water, impact etc. Another optional layer can be attached below the color layer to provide mechanical support, increase its rigidity and robustness, change its shape to a specific curvature, assist in heatsinking, Geometric shapes such as a crosshairs, circles or other shapes in high contrast placed on the custom color calibration chart to allow detection of orientation of the chart, its magnification and to allow for the subsequent automatic detection and analysis of the individual patches on the chart.

The custom color calibration chart can include alternating bars of black and white stripes to allow for detection and correction of chromatic aberration, focusing and other image quality metrics. The custom color calibration chart can include a grayscale gradient to allow for measurement and correction of non-linear responses of a sensor.

Embodiments of this disclosure can include creating a custom color calibration chart (workpiece specific color chart) without manual or human intervention. This can be termed unsupervised selection. This can be a significant commercial advantage because it provides the benefit of privacy to a customer (end-user) in that the custom color calibration chart can be produced, and even used for inspection, without a vendor or some other party outside the end-user organization actually viewing the end-user's workpiece.

Embodiments of this disclosure can include creating a customer color calibration chart with the ability to manually pick colors that are to be included on the calibration target. This can be termed supervised selection.

Embodiments of this disclosure can include a desktop device in which the user places the workpiece. Embodiments can include a manufacturing test cell on a factory floor in which workers place the workpiece. Embodiments can include a test cell over a continuous feed machine like a conveyor or gantry that is used to fixture the workpiece as it is manufactured in a continuous production process. The workpiece can continue to be in motion while one or more images of it are acquired. Embodiments can include a test cell that is moved over or into the workpiece. In this embodiment, an operator, a robot or unmanned vehicle places the cell over the workpiece. Such a movable test cell could be used in automotive manufacturing or in the manufacturing of furniture, appliances, airplanes or other large workpieces. One embodiment would be a handheld device placed over the workpiece Embodiments of this disclosure can include a stationary cell with a robot or unmanned vehicle to place the workpiece inside the stationary cell. Embodiments can include a stationary cell with a fixture that includes a web conveyor that transports web material (e.g. paper, plastic, non-woven) through the test cell. Embodiments of this disclosure can be used in microscopy, agricultural imaging and satellite imaging.

Color Target Design and Production

Wide Gamut (Reference) Color Target Design and Production

A wide gamut color target is required to establish the initial set of application specific colors to be used on an application color target. This means that, first, the wide gamut color target is produced and then, second, the application (work-piece) specific target is produced using the wide gamut color target.

A wide gamut color target can be defined using software like Photoshop that is capable of digitally addressing all the colors in the visible gamut. Although these include colors, typically at the extreme edges of the gamut that, cannot be produced on a monitor or printed on a substrate, embodiments of this disclosure can nevertheless produce functional targets with techniques described and enabled below.

Figure 4:
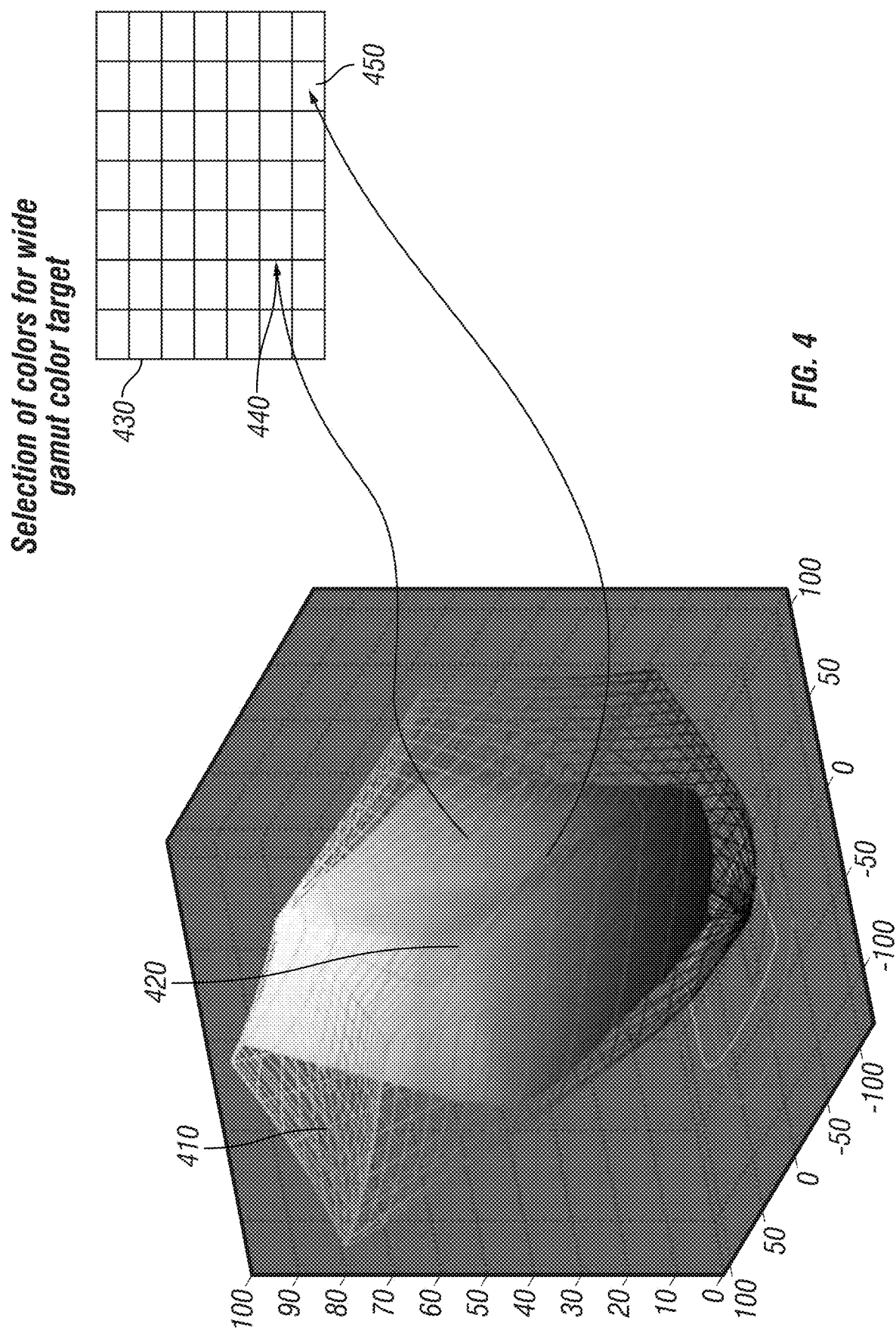
FIG. 4 is a stylized depiction of a process that can be implemented by a computer program to produce a wide gamut color chart (reference target).

The colors to be included can be defined in the CIE L*, a*, b* or other similar color space that encompasses all visible colors and is an absolute standard. The wide gamut color target can be a three dimensional volume of a convex shape; such as a bean shape or a pebble shape. Referring to FIG. 4, the three dimensional volume of a wide gamut 420 of printable colors can be appreciated as a pebble (or bean) shaped solid within a larger gamut of all perceptible colors 410. In FIG. 4, two colors in the CIE L*, a*, b* color space are shown being incorporated into a grid of color patches 430. A first color 440 is selected from the surface of the wide gamut 420 and can be termed a boundary color. A second color 450 is selected from the interior of the wide gamut 420.

Figure 5:
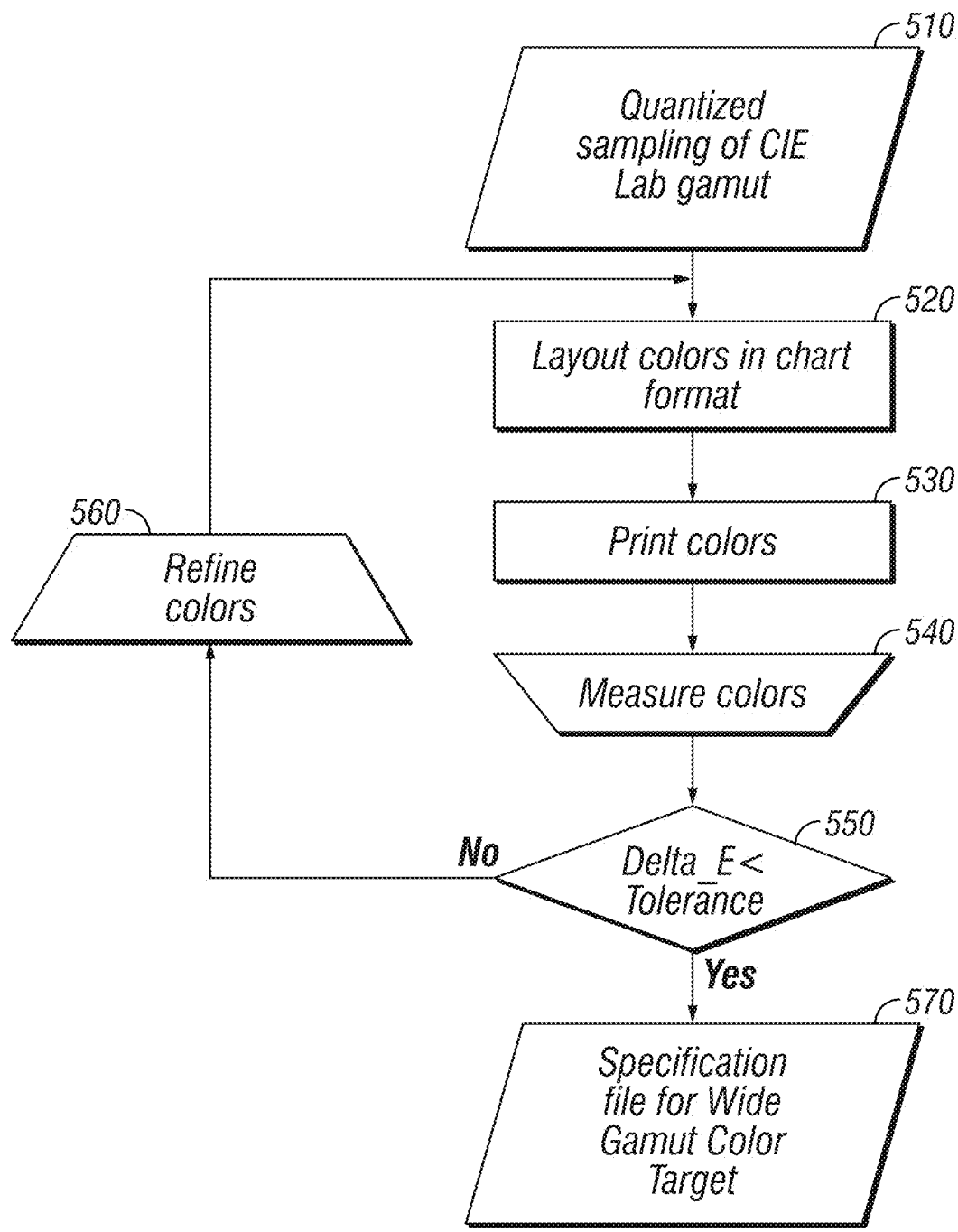
FIG. 5 is a flow diagram of a process that can be implemented by a computer program to produce a wide gamut color chart (reference target).

Referring to FIG. 5, a process can begin with a quantized sampling of a CIE Lab gamut 510. Then, a layout of color in chart format 520 is performed. Then, the colors are printed 530. Then, the printed colors are measured 540. Then, for each of the measured colors, a determination of whether Delta_E is within a tolerance 550 is performed. If the measured colors are within tolerance, then the specification file for wide gamut color target 570 is complete. If the measured colors are not within tolerance, then the colors are refined 560 and the process repeats starting at layout 520.

The colors to be included in the target can be defined by the following process. All the patches can be assumed to be equally sized for simplification. The maximum number of colors patches is picked using a reasonable size for each patch and the maximum dimensions of the target. A fraction of this number, typically 30%, of the patches is picked by randomly sampling the outer surface of the gamut of all colors. This is important and these can be termed "boundary colors". In a preferred embodiment, colors are picked from all parts of the gamut. For instance, the volume of the gamut of all colors is then divided into a number of equal smaller sub-volumes corresponding to the remaining number of patches. The colors for the patches can be picked using a statistical analysis of the colors within the sub-volumes (e.g. uniform, mean, random, skewed, etc.).

A variation of this approach allows for multiple colors to be picked from each sub-volume. Another variation of this approach allows for the same colors to picked for multiple patches The colors are written to a digital file which is compatible with Raster Image Processor (RIP) software used to manage color printing process. Using RIP software the colors are converted to the native color space of an inkjet or similar printer (or other color production process) that is typically defined in CMYK but can include more proprietary ink colors (typically 10-12) to allow for wider gamut and increased accuracy. The conversion process is done with the RIP software set to optimize the process for "absolute colorimetric" rendering intent. The default for most printing process is set to "Perceptual" which is not the optimal setting for the process of producing color targets.

The color target produced is then measured with a photo-spectrometer. Each patch is measured and the errors of the measured colors with respect to the intended colors are computed. A standard photo spectrometer like the Xrite i1 or Datacolor Spyder can be used to measure the target. The spectral data is used to compute LAB values with specific Illuminants and observers. Errors between the intended colors and the measured colors are then computed. Errors are computed for each component of color, L, a and b. A standard measure of the total error like Delta_E ($\Delta E^*_{ab}$) which is defined as the root mean square of the differences of each component is used as the single error value that will be minimized.

$$\Delta E^*_{ab} = \sqrt{(L^*_2 - L^*_1)^2 + (a^*_2 - a^*_1)^2 + (b^*_2 - b^*_1)^2}$$

Other measures can be computed and embodiments are not constrained to a particular calculation of the difference.

For the patches which are "boundary colors", if the errors are larger than a specific threshold, typically 2, the intended colors are replaced with the measured colors. If the errors are smaller than the threshold the patches are combined with the colors measured on all the other patches to create a regression model between the intended and printed colors. Using the regression model a new color target is defined that when printed will reduce the errors between the new intended colors and the measured colors. Only one iteration of this process is typically necessary unless the patch error is large (typically greater than 2). if the errors are larger than a specific threshold, typically 2, the intended, specified colors are replaced with the printed and measured colors and the process is repeated until the errors are reduced.

Wide gamut color targets should be printed on printers with the widest color gamut. If needed, multiple targets using different color print, paint, stain or any other color manufacturing process may be combined to create a wider gamut color target. The gamut should be larger than the expected gamut of any application gamut.

Calibration (e.g. Work-Piece Specific) Gamut Color Target Design and Production

The color target used for calibration in a specific application is produced using the following process. In preferred embodiments, the process is an iterative process. A first step is to use a wide gamut color target with the workpiece to obtain images in the imaging system. (Production of the wide gamut color target is described above.)

Figure 6:
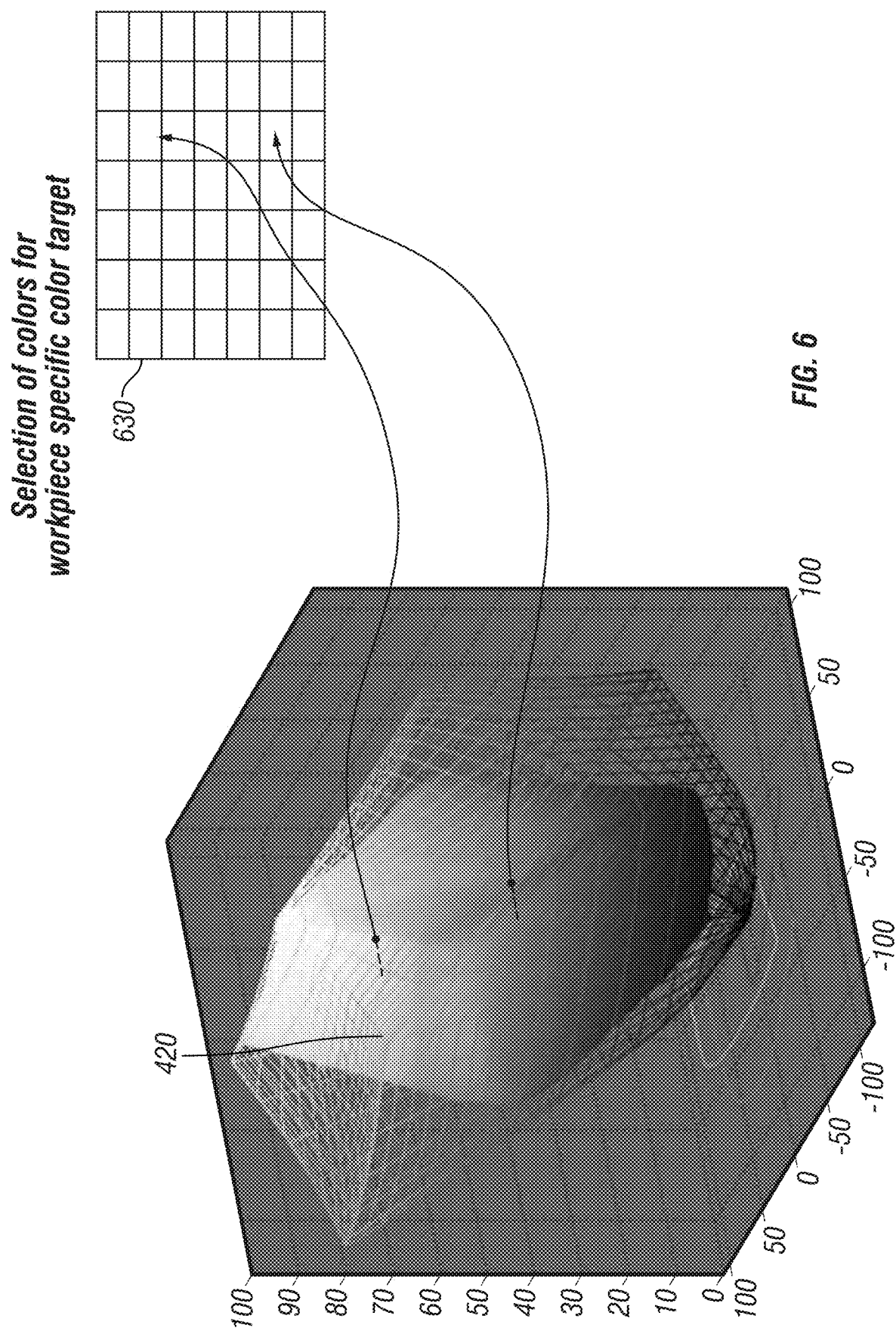
FIG. 6 is a stylized depiction of a process that can be implemented by a computer program to produce a custom color calibration chart (workpiece target).

Referring to FIG. 6, based on data imaged from a specimen and a wide gamut color target under the same or substantially similar lighting and enclosure conditions, two colors in the CIE L*, a*, b* color space defined by the wide gamut 420 are shown being incorporated into a grid of color patches 630. A first color 640 is selected from the interior of the wide gamut 420 based on data from both the specimen and the wide gamut color target keying to that location of the color space defined by the wide gamut 420. A second color 650 is selected, from the interior of the wide gamut 420 based on data from both the specimen and the wide gamut color target keying to that location of the color space defined by the wide gamut 420.

Figure 7:
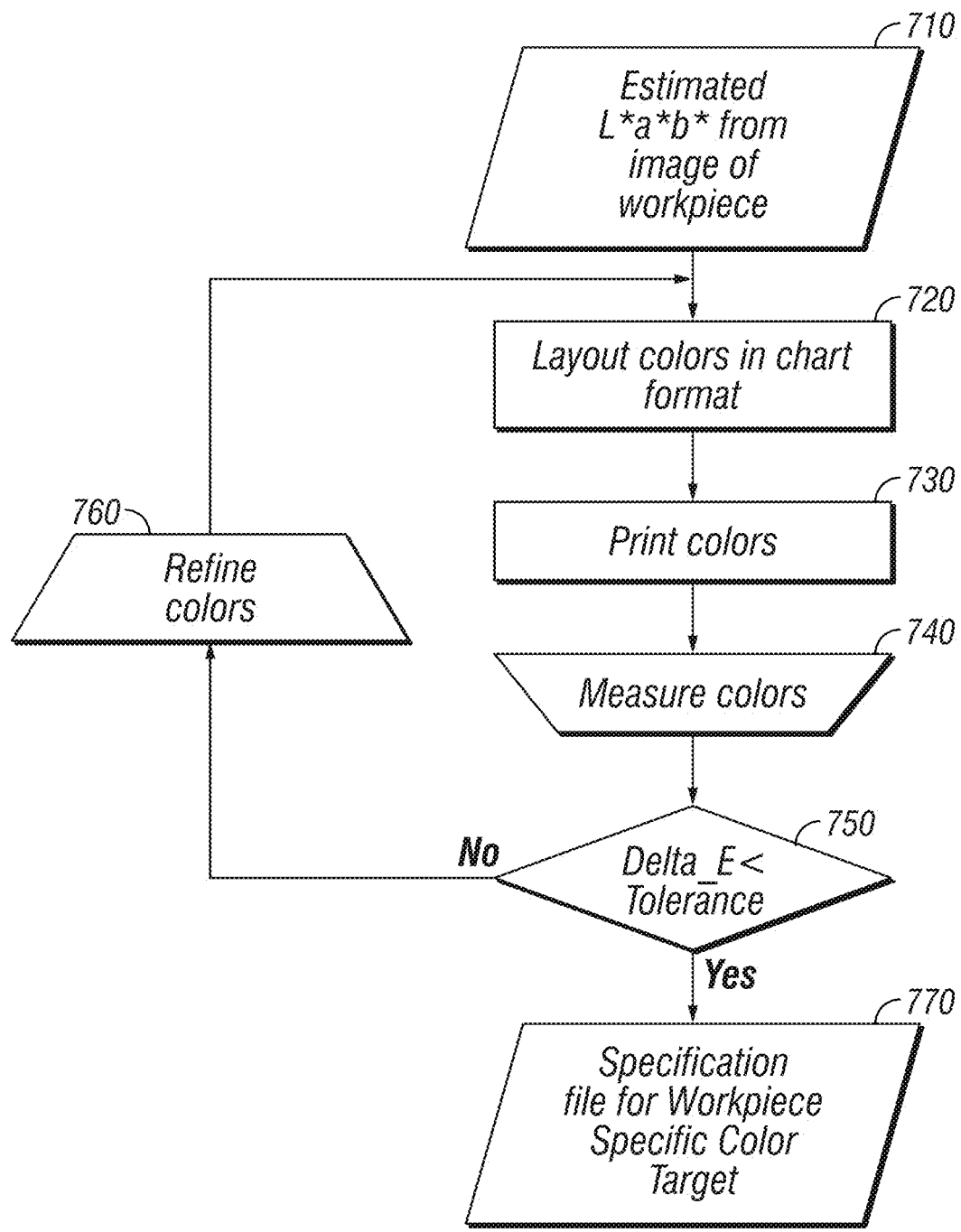
FIG. 7 is a flow diagram of a process that can be implemented by a computer program to produce a custom color calibration chart (workpiece target).

Referring to FIG. 7, a process can begin with an estimated L*, a*, b* from imaging of a specimen or workpiece 710. Then, a layout of color in chart format 720 is performed. Then, the colors are printed 730. Then, the printed colors are measured 740. Then, for each of the measured colors, a determination of whether Delta_E is within a tolerance 750 is performed. If the measured colors are within tolerance, then the specification file for wide gamut color target 770 is complete. If the measured colors are not within tolerance, then the colors are refined 760 and the process repeats starting at layout 720.

In a preferred embodiment, the specimen and wide gamut image data is sent to a computer and from there over the network to a server. On the server, the image data is used to estimate the CIE Lab color values of the pixels. Software on the server is used with these color measurements to design a workpiece specific color target. The process of picking the colors for this target is described below.

Use the wide gamut color transformation to estimate colors of regions of the workpiece. Colors for each uniform region of interest should be measured. For example, 200, 300 or 400 workpiece colors can be measured. Color measurement should be averaged over as many pixels as possible to reduce noise.

The workpiece measured colors should be compared to the wide gamut "boundary colors" of the wide gamut color chart documentation. If workpiece measured colors are close, e.g. Delta_E<3, then they should be replaced by the boundary colors. One reason for this replacement is that it is known a priori that the boundary colors can in-fact be printed. In a preferred embodiment, if there are fewer candidates for replacement than a specified number B of boundary color replacements that are picked by this process, then the rest of the B colors can be picked by a random sample of the boundary colors used for the wide gamut color chart. For instance, given 300 workpiece colors measured, B can be set to 10; and if 3 boundary color replacements are made based on the measured data from the workpiece, the remaining 7 can be triggered random boundary color replacements. The rest of the colors within the gamut are referred to as the "sample gamut".

The workpiece color measurement data can be analyzed with statistical tools for cluster analysis such as k-means clustering. Clusters of data within the sample gamut can be identified and labeled.

In a preferred embodiment, for at least one cluster, a process similar to the one described for wide gamut color chart production can be followed by treating the colors close to the surface of the cluster as cluster boundary colors and the colors inside the cluster can be sampled after partitioning the interior of the cluster into a number of equal volumes. This can be an important advantage of embodiments of this disclosure because it enables deeper digital assessment of color within clusters of interest. For instance, a given cluster of measured workpiece data can be used to define a "micro gamut" (cluster gamut) where approximately 30% of the color patches available to represent that micro gamut are initially dedicated to cluster boundary colors and the remaining 70% are sampled from the other cluster colors after partitioning the cluster into a number of equal sub-volumes.

These colors from each cluster can be combined with the boundary colors to create an application specific color chart specification. The resulting application or workpiece specific gamut of the custom color calibration chart is relatively narrow compared to the much wider gamut of the wide gamut color target.

This process can be a regression so embodiments can include iteration at least once. The chart is printed and measured with a photo-spectrometer.

Errors between the intended and measured colors are computed and if they exceed Delta_E of 3 the colors are replaced by the measured colors. The rest of the measurements are fit with a regression to the intended colors and the intended colors are replaced by the corresponding fit colors.

The color target gels printed again and the color patches are measured again to compare to the intended values. If the errors are low, typically Delta_E less than 3, the process is completed. The measurements for each chart are saved with production information including dates and layout to be used in the calibration of the image data.

Transformation from Measured RGB (or Other Spectral Bands) to Desired Color Space (E.g. CIE Lab 1931)

Once the wide gamut color target has been produced it is imaged in the vision system. Assuming a color RGB camera with no loss of generality, the image produced is an RGB image. The image RGB pixels for each patch are recorded and a statistical analysis performed to remove outliers and compute means or other statistically relevant quantities. The measured Lab colors for each patch and the RGB measurements are then used to create a model of transformation from the RGB color space to the Lab color space. The Transform is customized for each application. Embodiments can include multidimensional transform estimation techniques such as: sparse multivariate regression with covariance estimation; local linear approximations for non-linear regressions; non-linear regression with parametric models; non-pararrietric regression with K-nearest neighbor, neural network, or similar.

It is important to appreciate that a high density of the sampled points in the application gamut and/or random distribution of sampled points within equally spaced sub-volumes within the gamut allow for a computation of a transformation that is not sensitive to the sampled points. This ensures that the production of new application calibration charts with different materials or production process does not result in large measurement errors. This also allows for a stable measurement strategy where the colors on the target do not have to be the same and the resulting transformation can be practically identical. This also allows for production of color charts with multiple sets of colors patches only parts of which are selected to be used for particular application and other parts can be used to compute another transformation for a different portion of the color gamut or application. The use of the color patches and their weight in computing a transformation can be customized for each application to allow for optimization. While an embodiment is sometimes limited by size of the color chart, it could include both "wide gamut" and application specific color patches whose use is defined in software. This transformation is learned for each presentation of the wide gamut chart and applied to any workpiece present in the same image or subsequent image for which the chart may or may not be present in the image. By limiting the application gamut to be a portion of the full visible gamut of colors and further allowing multiple transforms to be used in different portions of the application gamut, we can optimize the accuracy of the transformation.

As an example, the software can detect clusters of colors and create an independent transformation for each cluster. Different transformations may be assigned to pixels in the image that are on different parts or heights of the workpiece.

Calibration

The wide gamut color target may be used to create a factory default calibration for a system. Typically the wide gamut chart will contain a very large number (1000's) of colors and therefore will be very large. If it is too large to place in the view of the camera simultaneously as the workpiece then it can be imaged prior to imaging the workpiece. The application specific color targets are desired to be designed such that they can be placed in the view of the camera simultaneously with the workpiece. If this is not possible the calibration is created with the applications specific target prior to imaging the workpiece.

In the case where the application color target is too large for viewing alongside the workpiece, it is highly desirable that another Inline color target with a few patches be placed in the view. At least one patch is a shade of gray that is close to the highest reflectance of the workpiece but does not exceed it. Another patch, if present, is a shade of gray that is close to the lowest reflectance value of the workpiece but not lower. Another patch, if present, is the dominant color of the workpiece. Other patches, if present, are specified based on the application and the workpiece. The purpose of this "Inline" color target is to allow for corrections of the intensity and the spectrum of the lighting in the presence of the workpiece. It is often observed that the workpiece can affect the color of the lighting by absorbing specific colors and reflecting others. This can cause the calibration, created without the workpiece in the view to be less accurate than the one created with workpiece in the view. The Inline color target can be used to measure the shift in the color of the lighting in the presence of the workpiece and subsequently correct for it. The type of correction applied can be a normalization to the known color values of the patches or a regression to multiple color values. This correction is combined with the calibration learned from the application specific color target.

Measurement

The system may be used to measure whether the various colors on a workpiece meet a required tolerance. A specific application color target would be designed by using the colors expected on a "good" workpiece. A custom color transformation would be computed with these colors and the use of the wide gamut chart described above. The workpiece would be fixtured in the system preferably with the application gamut chart included in the view of the camera. The software will be programmed to identify the parts of the workpiece that require inspection. The software will automatically identify these parts of the workpiece and measure the colors of these parts using the transformations learned. The colors can be compared to those measured from known good parts and a decision on the quality can be made. Embodiments can be more sophisticated than just a simply pass-fail or grading. For instance, an embodiment could include determining whether peeling of a vegetable has proceeded too far or too little. Similarly, an embodiment could include determining whether cooking has proceeded too far or too little. A statistical process control algorithm could be used with the colors from the workpieces to detect changes from an expected norm. A machine learning algorithm like a Naïve Bayesian Classifier can be trained with colors from portions of the workpiece and used to identify similar portions on another workpiece. This could be used to classify each portion of the workpiece according to its color and its other visible properties like texture and geometry. The proportion of colors present on a workpiece can be used to determine the overall quality of a workpiece. Multiple workpieces might be presented at once and their individual quality assessment can be combined with knowledge of their relationship to assess the overall quality of a larger population or a larger workpiece.

For example, a measurement of the surface area with a specific color characteristic is often used in an application for assessing the effectiveness of a process such as removal of a surface layer, or the treatment of the workpiece with a process to affect its surface properties, or the application of paint or other additive layer to the surface. In the food industry these processes might correspond to removal of layers of a vegetable or a nut, the frying of the vegetable or the nut, and the seasoning of the fried vegetable or nut.

For another example, the workpieces may be parts of an assembly and the colors of the workpieces encode their position or other functional attribute. In the electronics industry the colors may encode the position of wires in a cable harness, the electrical attributes of the components on a printed circuit board or the specific devices on a wafer.

A machine learning algorithm can be used to train the colors that would correspond to good or bad parts of a workpiece based on CIE Lab colors measured with one set of hardware (for example a desktop system) and an application specific color target and then this training can be used on a completely different set of hardware (e.g. an online system with a linescan camera and different type of lighting) for which another custom transformation has been computed with the same application specific color target. A lookup table between the camera RGB values and the classified result could be used to efficiently classify the good or bad parts of the workpiece without computing the colors of the workpiece in CIE Lab space.

Figures 9A, 9B:
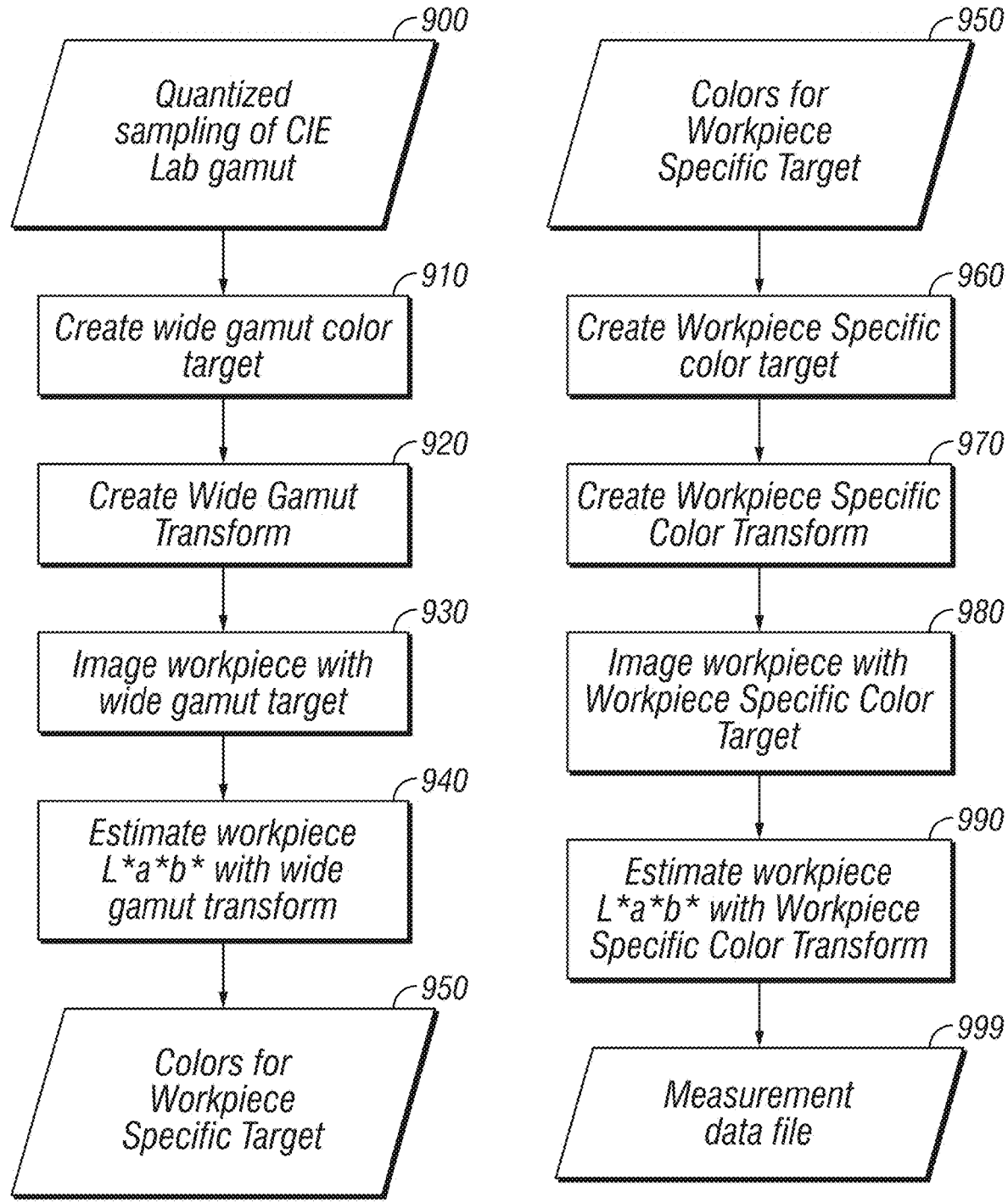
FIGS. 9A and 9B are flow diagrams of processes that can be implemented by a computer program to make and use both a wide gamut color chart and a custom color calibration chart.

A generic embodiment will now be described with reference to FIGS. 9A-9B. Referring to FIG. 9A, calibration can begin with a quantized sampling of CIE Lab gamut 900. Then, the sample is used to print a wide gamut color target 910. Then, the process creates a wide gamut transform 920. Next, apparatus is used to image workpiece with wide gamut target 930. Then, the process estimates workpiece L*a*b* with the wide gamut transform 940. This results in the colors for the workpiece specific target 950. Referring to FIG. 9B, the colors for the workpiece specific target 950 are used to print a workpiece specific color target 960. Then, the process creates a workpiece specific color transform 970. Next, apparatus is used to image the workpiece with the workpiece specific color target 980. Then, the process estimates workpiece L*a*b* with the workpiece specific color transform 990. This results in a measurement data file 999.

Example Applications

Embodiments of this disclosure can be used for color inspection of a large workpiece that is multicolored, such as for example, manufactured or natural materials like Formica countertops, carpets, laminates, borehole cores from oil wells etc. Embodiments can be used to check for dominant color. Embodiments can be used to check for color patterns. Embodiments can be used to check for color contrast. Embodiments can be used to check for colors of fibers. Embodiments can be used to check for percent of area covered by each color. Embodiments can be used to characterize borehole core material such as color analysis to determine geological features. Embodiments can be used for inspection of a collection of workpieces e.g. wood cores, vegetables or fruits, processed snack foods, etc. This can be performed with an as-acquired image from a camera and/or a color corrected image.

Embodiments of this disclosure can be used to process a classification image based on the application. For example, each pixel is mapped to one of 5 classes based on its color. The result of the inspection is based on the percentage of one or more color classes in each workpiece or the whole sample.

Embodiment can be used for color inspection of 3 dimensional natural or manufactured workpieces. The measured color from a camera is affected by both the distance and the angle of each point in the image of the workpiece. In the previous cases the distance was assumed to be constant and the angle between the normal to the surface of the workpiece and the normal to the camera sensor is assumed to be small.

Embodiments can be used for color inspection of molded plastic containers. Color on some portions of the containers that are angled away from the camera will be affected by this shape. A correction for the shape can be made by using a known geometry (e.g. a known slope between two features in the image), measuring the 3d geometry in situ, and other conventional methods.

Embodiments can be used for inspection of assembled shoes. Colors of each part are checked to tolerance taking into account the variation of the surface normal to the vertical viewing axis.

Figure 10:
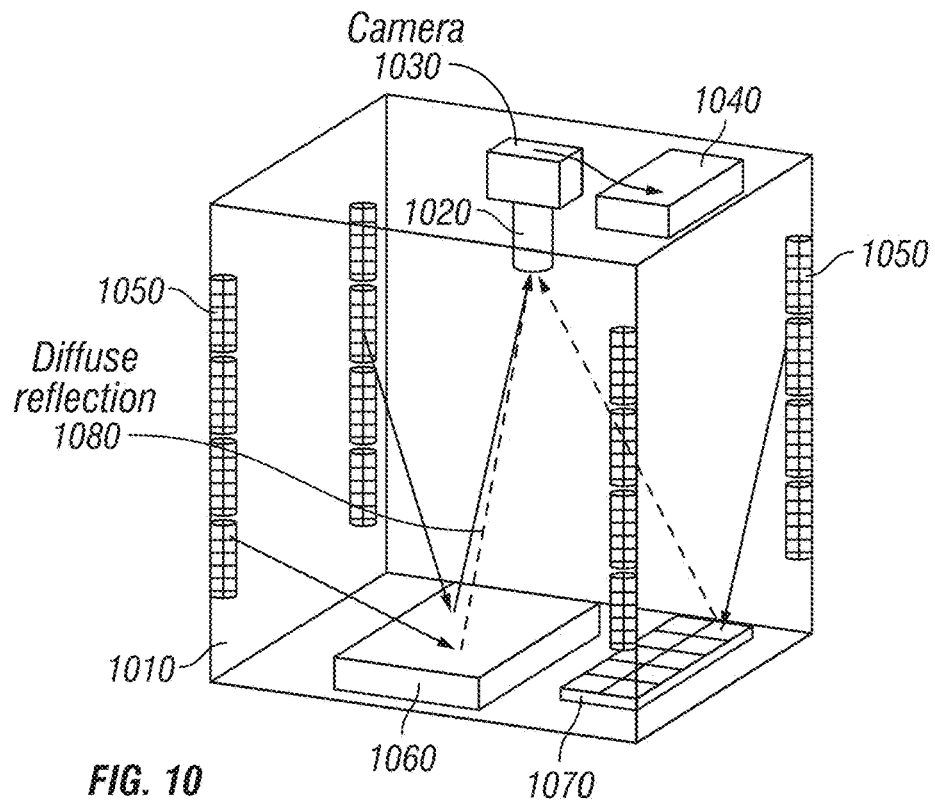
FIG. 10 is a schematic perspective view of a machine for digital color assessment containing a diffuse (matte) flat workpiece.

Referring to FIG. 10, inspection of a matte flat workpiece is illustrated. An enclosure 1010 includes a lens 1020 that is coupled to a camera 1030 that is in-turn coupled to an image processing system 1040. A plurality of segmented LED columns 1050 illuminate a matte flat workpiece 1060 and a custom color calibration chart 1070. Diffuse reflection 1080 from the matte flat workpiece 1060 and the custom color calibration chart 1070 is imaged by the lens 1020, camera 1030 and image processing system 1040.

Figure 11:
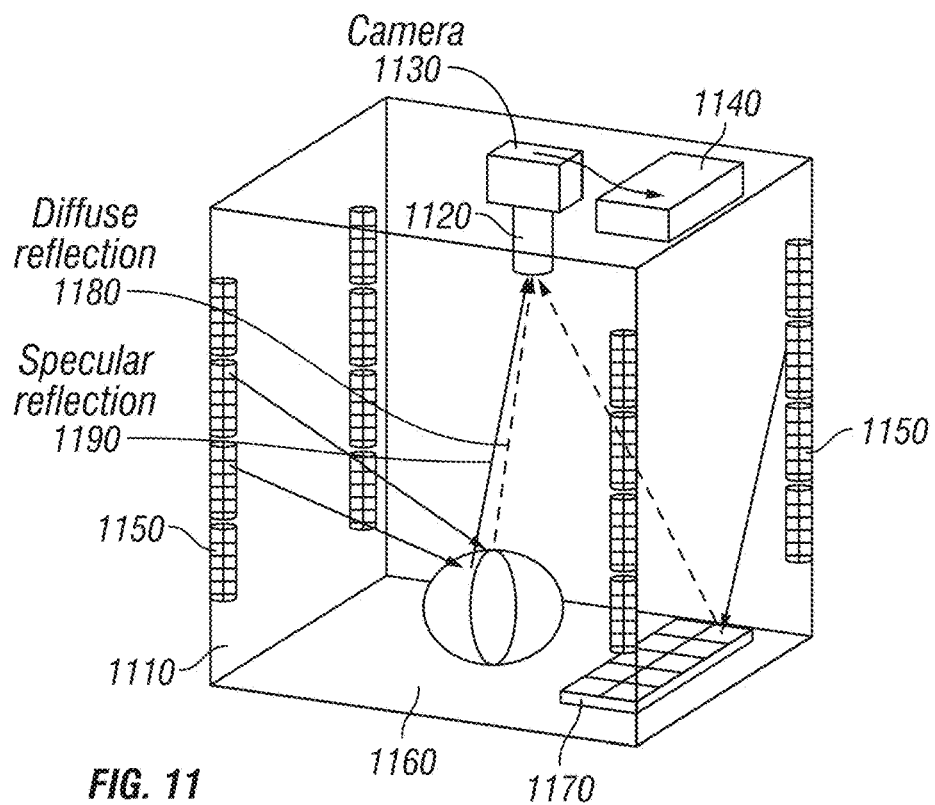
FIG. 11 is a schematic perspective view of a machine for digital color assessment containing a shiny spherical workpiece.

Referring to FIG. 11, inspection of a shiny spherical workpiece is illustrated. An enclosure 1110 includes a lens 1120 that is coupled to a camera 1130 that is in-turn coupled to an image processing system 1140. A plurality of segmented LED columns 1150 illuminate a shiny spherical workpiece 1160 and a custom color calibration chart 1170. Diffuse reflection 1180 from the shiny spherical workpiece 1160 and the custom color calibration chart 1170 is imaged by the lens 1120, camera 1130 and image processing system 1140. Specular reflection 1190 from the shiny spherical workpiece 1160 is also imaged by the lens 1120, camera 1130 and image processing system 1140.

When, as in FIG. 11, the workpiece has specular reflection, multiple images can be acquired with each LED segment turned on or off individually to allow mapping of the surface normal and this information can be used to remove the specular component of the reflections (shown highlighted in the image). The distance of each point can be estimated by using either the known geometry of the workpiece or measuring it with stereo time-of-flight, or laser triangulation based measurement. By recording multiple images with each segment of the LED illumination turned on and comparison of the images the surface normal at various points can be computed. This information can be used to normalize the measured color for angular variation. This information can then be used to eliminate specular reflection from the measurement and estimate the true surface reflectance.

Definitions

The term color patch is intended to mean an area or zone such as a set of pixels within a digital photograph or a physically discrete object that may be either adjacent or spaced apart from other color patches. The term substrate is intended to mean a substance or layer that underlies one or more color patches and to which the color patches adhere such as paper or plastic in a 2D or 3D form. The term reference is intended to mean at least one color for which standardized characterization documentation is available. The term workpiece is intended to mean a specimen such as an article of clothing or a shoe, a piece of wood or furniture, a vegetable, fruit or cut of meat.

The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, c servlet, a source code, an object code, a shared library/dynamic load library and/or other sequence of instructions designed for execution on a computer or computer system). The term light is intended to mean frequencies greater than or equal to approximately 300 GHz as well as the microwave spectrum.

The term uniformly is intended to mean unvarying or deviating very little from a given and/or expected value (e.g., within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub) method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. An apparatus, comprising:
    an enclosure having a double layer wall including an outer wall that provides mechanical protection and protection from dust, fluids and environmental factors and an inner wall having a gradient change in reflectance with height within the enclosure;
    a lens coupled to the enclosure, the lens defining an optic axis that is within the enclosure and parallel to the gradient change in reflectance with height;
    a camera coupled to the lens;
    an image processing circuit coupled to the camera; and
    a plurality of elongated light sources coupled to the enclosure, the plurality of light sources defining a plurality of illuminant axes located substantially symmetrically around and parallel to the optic axis,
    wherein each of the plurality of elongated light sources includes a plurality of independently controllable segments located along the illuminant axes so an angle of illumination from the plurality of light sources to the optic axis can be controlled.

2. A manufacturing line comprising the apparatus of claim 1, wherein the enclosure includes a manufacturing test cell.

3. The apparatus of claim 1, wherein each segment of the plurality of light sources is turned on or off individually along the plurality of illuminant axes and parallel to the gradient change in reflectance with height to allow mapping of a surface normal.

4. The apparatus of claim 1, wherein the enclosure is optically opaque to eliminate light from entering the enclosure.

5. The apparatus of claim 1, wherein the inner wall includes a spectrally uniform light reflectance.

6. The apparatus of claim 1, wherein the inner wall includes a matte texture to eliminate specular reflection that causes hot spots on a workpiece.

7. The apparatus of claim 1, wherein the inner wall includes ceramic for high temperature resistance.

8. The apparatus of claim 1, wherein the inner wall includes:
    a spectrally uniform light reflectance; and,
    a matte texture to eliminate specular reflection that causes hot spots on a workpiece.

* * * * *